United States Patent
Sun et al.

(10) Patent No.: US 10,986,215 B2
(45) Date of Patent: Apr. 20, 2021

(54) ACCESS CONTROL IN THE REMOTE DEVICE OF NETWORK REDIRECTOR

(71) Applicant: VMware, Inc., Palo Alto, CA (US)

(72) Inventors: Qi Sun, Beijing (CN); Adam Gregory Gross, Palo Alto, CA (US); Bo Steven Liu, Beijing (CN); Zhao Li, Beijing (CN); Li Huang, Beijing (CN); Feng Yan, Beijing (CN); Kun Shi, Beijing (CN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/537,865

(22) Filed: Aug. 12, 2019

(65) Prior Publication Data

US 2021/0014334 A1    Jan. 14, 2021

Related U.S. Application Data

(63) Continuation of application No. PCT/CN2019/095165, filed on Jul. 9, 2019.

(51) Int. Cl.
*H04L 29/06* (2006.01)
*G06F 9/455* (2018.01)
*G06F 21/62* (2013.01)

(52) U.S. Cl.
CPC .......... *H04L 67/42* (2013.01); *G06F 9/45533* (2013.01); *G06F 21/6218* (2013.01); *G06F 2009/45595* (2013.01); *G06F 2221/2141* (2013.01)

(58) Field of Classification Search
CPC . H04L 67/42; G06F 9/45533; G06F 21/6218; G06F 2009/45595; G06F 2221/2141
See application file for complete search history.

(56) References Cited

U.S. PATENT DOCUMENTS

| | | | |
|---|---|---|---|
| 2014/0229934 A1* | 8/2014 | Larkin | G06F 8/65 718/1 |
| 2015/0358392 A1* | 12/2015 | Ramalingam | H04L 41/0273 709/203 |
| 2016/0366135 A1* | 12/2016 | Furuichi | H04L 41/0866 |
| 2017/0286673 A1* | 10/2017 | Lukacs | G06F 21/51 |
| 2018/0083837 A1* | 3/2018 | Teng | H04L 43/14 |

* cited by examiner

*Primary Examiner* — Azizul Choudhury
(74) *Attorney, Agent, or Firm* — Patterson + Sheridan, LLP

(57) ABSTRACT

An approach for accessing one or more resources at a virtualized desktop infrastructure (VDI) client running on a client device by a remote virtual machine (VM) is provided. The method includes intercepting, via a VDI agent, a request to access one or more resources at the client device, transferring the request from the remote VM to the client device via a network redirector protocol, and filtering the request to determine if the request complies with one or more rules. For a first resource of the one or more resources, if the request does not comply with any one of one or more first rules of the one or more rules, access to the first resource is denied. If the request complies with the one or more first rules, access to the first resource is granted and a response is sent to the VDI agent via the network redirector protocol.

18 Claims, 4 Drawing Sheets

ACCESS CONTROL IN THE REMOTE DEVICE OF NETWORK REDIRECTOR

CROSS-REFERENCE TO RELATED APPLICATIONS

The present Application for Patent claims priority to PCT International Application No. PCT/CN2019/095165, entitled "ACCESS CONTROL IN THE REMOTE DEVICE OF NETWORK REDIRECTOR," filed Jul. 9, 2019, which is assigned to the assignee hereof, and expressly incorporated herein by reference.

PRIOR DISCLOSURE BY THE INVENTORS

Aspects of the invention described herein were disclosed in VMware Horizon 7 Version 7.7, released publically on Dec. 13, 2018. Release notes for this version are available online at https://docs.vmware.com/en/VMware-Horizon-7/7.7/rn/horizon-77-view-release-notes.html.

BACKGROUND

Virtual machines (VMs) may be executed on a host computing device. Each VM provides an abstraction of physical computing resources, such as a processor and memory, of the host executing the VM. The guest operating system and guest software applications executing within a VM may function in a manner similar to how they would function if executing directly on physical resources of the host.

A VM may provide a virtual desktop that is accessible through a network by one or more remote users using one or more client devices. A virtual desktop is a VM configured with a guest operating system and desktop software intended for interaction with an end user. Typically, each virtual desktop is configured as a standard physical desktop computer system that, along with productivity applications such as word processors, spreadsheets, email, etc., provide a rich user interface for interaction with a particular user—the user for whom the desktop is configured and to whom the desktop is assigned.

For example, a client device runs a virtual desktop infrastructure (VDI) client that is configured to interact with a VDI agent running in the VM that provides the virtual desktop to the client device. The VDI client and VDI agent are both configured to implement a network redirector protocol. The network redirector protocol, in part, defines the operation of VDI agent and VDI client to allow the VM to access files or other resources (e.g., printers or smart cards) on the client device. For example, the VDI agent sends or redirects requests made by applications running on the VM. These requests are sent to the VDI client on the client device to request access to resources on the client device. The VDI client then processes and fulfills the requests and sends responses back to the VDI agent.

Conventionally, the VDI client is configured to restrict or grant access to resources on the client device by the VM on a per-user basis, as opposed to a per-specific device basis. The VDI client grants or restricts access by either processing and fulfilling all requests from the VDI agent or not processing and fulfilling any requests from the VDI agent. Restriction on this basis means that the VDI client shares files with the VM on a per-folder basis, meaning that access to an entire folder (or other resource) is either granted in full or completely restricted. Therefore, to grant access, the VDI client has to grant the VDI agent access to more files or devices in the client device than is necessary to fulfill the request, which creates a security issue.

SUMMARY

Embodiments provide a method of accessing one or more resources at a VDI client running on a client device by a remote VM, where the remote VM is connected to the VDI client through a network and the remote VM and VDI client provide a virtual desktop at the client device. The method includes intercepting, via a VDI agent at the remote VM, a request to access one or more of the resources at the client device, the request generated based on an input at the virtual desktop. The method then includes transferring the request from the remote VM to the client device via a network redirector protocol and filtering the request via the VDI client at the client device to determine if the request complies with one or more rules. For a first resource of the one or more resources, if the request does not comply with any one of one or more first rules of the one or more rules corresponding to the first resource, the method includes denying access to the first resource. If the request complies with the one or more first rules, the method includes granting access to the first resource and sending a response to the VDI agent via the network redirector protocol.

Further embodiments include a non-transitory computer-readable storage medium storing instructions that, when executed by a computer system, cause the computer system to perform the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach for adding access control at a client device for accessing resources of the client device by another device to achieve more flexible and customized security protection. For example, certain embodiments are described herein with respect to a VDI environment where access control is implemented at a client device to control access to resources of the client device by a VM configured to provide a virtual desktop to the client device. In certain embodiments, one or more access filters are implemented by the client device to enforce access rules. Each rule can correspond to a filter. A user can input access rules using a user interface (UI). In another embodiment, access rules can be automatically implemented based on user actions. The access rules operate to limit access to only files, devices, or other resources of the client device that are necessary to respond to the requests from the VM. The VM will therefore not have access to all resources at the client device, unless full access is necessary to fulfill the request.

Figure 1:
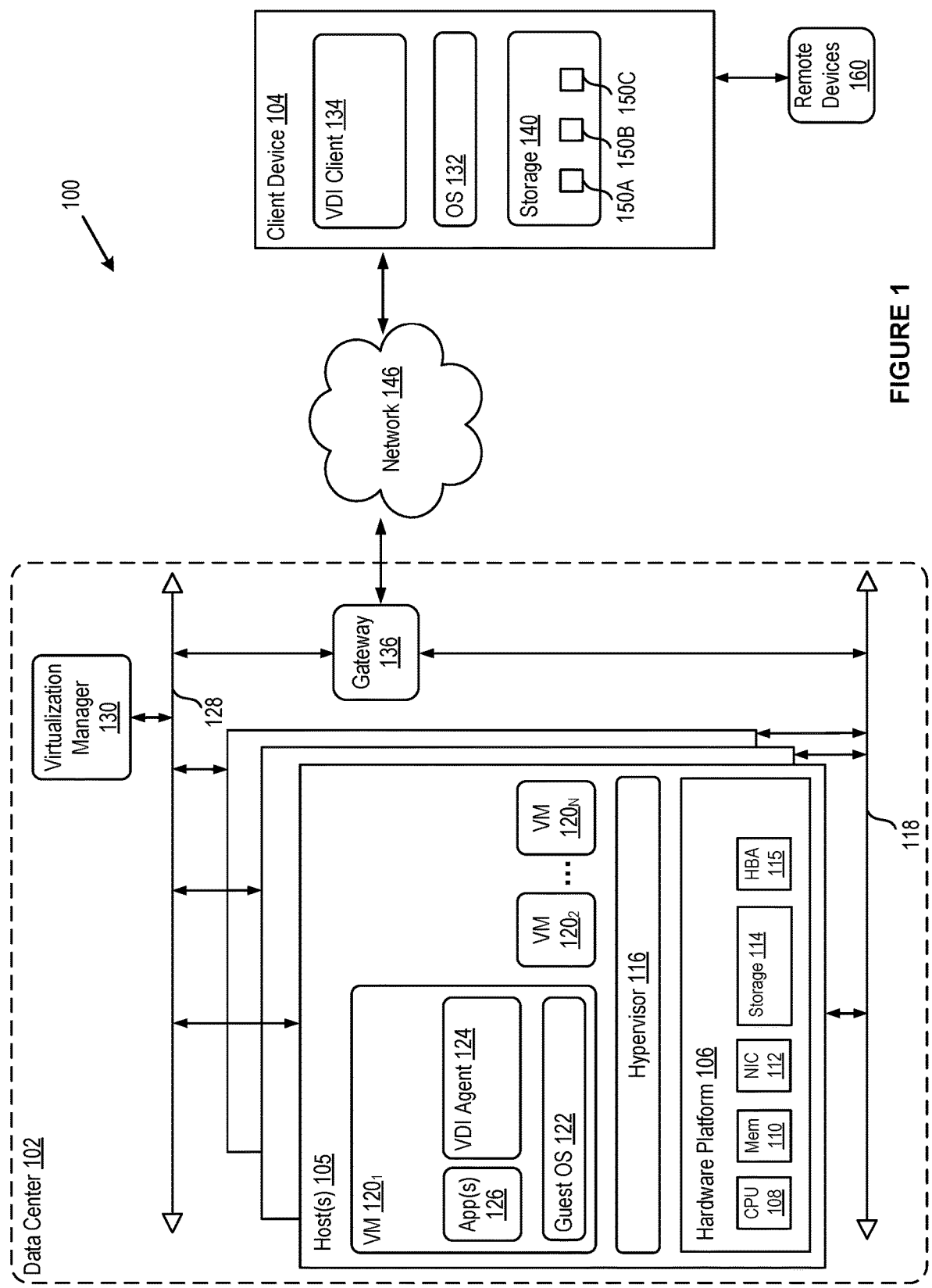
FIG. 1 depicts a block diagram of a virtualized desktop infrastructure system in which one or more embodiments of the present invention may be implemented.

FIG. 1 depicts a block diagram of a virtualized desktop infrastructure (VDI) system 100 in which one or more embodiments of the present invention may be implemented. VDI system 100 comprises at least one client device 104 and a data center 102, connected by a network 146. Network 146 may be, for example, a direct link, a local area network (LAN), a wide area network (WAN) such as the Internet, another type of network, or a combination of these.

Client device 104 is a physical device, such as a general purpose desktop computer or mobile computer. A mobile computer may be, for example, a laptop, a mobile phone, or a tablet computer. Client device 104 includes VDI client 134 and operating system (OS) 132, with VDI client 134 running on top of OS 132. OS 132 may be a standard, commodity operating system.

VDI client 134 is a user-side interface of a virtualized desktop running on one of virtual machines (VMs) 120 at data center 102. As used herein, a "virtualized desktop" is a desktop running on one of VMs 120 that is displayed remotely on client device 104, as though the virtualized desktop were running on client device 104. By opening VDI client 134, a user of client device 104 accesses, through network 146, a remote desktop running in remote data center 102, from any location, using client device 104. Frames of the remote desktop running on VM 120 are transmitted to VDI client 134 at a certain frame rate using a desktop delivery protocol such as VMware® Blast™, or Microsoft® Remote Desktop Protocol (RDP)™.

After transmission, the frames are displayed on client device 104 for interaction by the user. Client device 104 sends user inputs to VM 120 for processing on VM 120 of data center 102, taking processing load off of client device 104. Such centralized and automated management of virtualized desktops provides increased control and cost savings. VDI client 134 may be, for example, VMware® View™, or a special purpose thin client such as those available from Dell, HP, NEC, Sun Microsystems, Wyse, and others.

Data center 102 includes host(s) 105, a virtualization manager 130, a gateway 136, a management network 128, and a data network 118. Although the management and data network are shown as separate physical networks, it is also possible in some implementations to logically isolate the management network from the data network using different VLAN identifiers. Each of hosts 105 may be constructed on a server grade hardware platform 106, such as an x86 architecture platform. For example, hosts 105 may be geographically co-located servers on the same rack.

Host 105 is configured to provide a virtualization layer, also referred to as a hypervisor 116, that abstracts processor, memory, storage, and networking resources of hardware platform 106 into multiple VMs $120_1$ to $120_N$ (collectively referred to as VMs 120 and individually referred to as VM 120) that run concurrently on the same host. Hypervisor 116 may run on top of the operating system in host 105. In some embodiments, hypervisor 116 can be installed as system level software directly on hardware platform 106 of host 105 (often referred to as "bare metal" installation) and be conceptually interposed between the physical hardware and the guest operating systems executing in the virtual machines. In some implementations, the hypervisor may comprise system level software as well as a "Domain 0" or "Root Partition" virtual machine, which is a privileged machine that has access to the physical hardware resources of the host. In this implementation, one or more of a virtual switch, virtual tunnel endpoint (VTEP), etc., along with hardware drivers, may reside in the privileged virtual machine. Although the disclosure is described with reference to VMs, the teachings herein also apply to other types of virtual computing instances (VCIs), such as containers, Docker containers, data compute nodes, isolated user space instances, namespace containers, and the like. In certain embodiments, VMs 120 may be containers that run on host 105 without the use of a hypervisor. One example of a hypervisor 116 that may be used is a VMware ESXi™ hypervisor provided as part of the VMware vSphere® solution made commercially available from VMware, Inc. of Palo Alto, Calif.

Each VM 120 configured to provide a virtual desktop includes a guest OS 122, one or more applications 126, and a VDI agent 124. Application(s) 126 and VDI agent 124 run on top of guest OS 122. Guest OS 122 may be a standard, commodity operating system. An application 126 may be any software program, such as a word processing program.

VDI agent 124 is a desktop virtualization program that connects to VDI client 134 of client device 104, through network 146. The connection between VDI agent 124 and VDI client 134 may be authenticated, such as through a username and password combination pertaining to client device 104 or to a user of client device 104. VDI agent 124 transmits, to VDI client 134, image frames of the desktop running on VM 120 that contains VDI agent 124. An image frame includes information on appearance of the desktop running on VM 120, and that information includes pixel color and location information. In addition to an image frame, VDI agent 124 may also transmit metadata of that frame to VDI client 134. The metadata may include x and y coordinate locations of a mouse cursor, x and y coordinates and size of windows of application(s) 126 open on the desktop, which application(s) 126 are running on and/or displayed on the desktop of VM 120, and other information.

Hardware platform 106 of each host 105 includes components of a computing device such as one or more processors (CPUs) 108, system memory 110, a network interface 112, storage system 114, a host bus adapter (HBA) 115, and other I/O devices such as, for example, a mouse and keyboard (not shown). CPU 108 is configured to execute instructions, for example, executable instructions that perform one or more operations described herein and that may be stored in memory 110 and in storage 114. Network interface 112 enables host 105 to communicate with other devices via a communication medium, such as network 118 or network 128. Network interface 112 may include one or more network adapters, also referred to as Network Interface Cards (NICs). Storage system 114 represents persistent storage devices (e.g., one or more hard disks, flash memory modules, solid state disks, and/or optical disks). Host bus adapter (HBA) couples host 105 to one or more external storages (not shown), such as a storage area network (SAN). Other external storages that may be used include network-attached storage (NAS) and other network data storage systems, which may be accessible via NIC 112.

System memory 110 is hardware allowing information, such as executable instructions, configurations, and other data, to be stored and retrieved. Memory 110 is where programs and data are kept when CPU 108 is actively using them. Memory 110 may be volatile memory or non-volatile memory. Volatile or non-persistent memory is memory that needs constant power in order to prevent data from being erased. Volatile memory describes conventional memory, such as dynamic random access memory (DRAM). Non-volatile memory is memory that is persistent (non-volatile). Non-volatile memory is memory that retains its data after having power cycled (turned off and then back on). Non-volatile memory is byte-addressable, random access non-volatile memory.

Though not shown, client device 104 includes a hardware platform, which may be similar to hardware platform 106.

Virtualization manager 130 communicates with hosts 105 via a network, shown as a management network 128, and carries out administrative tasks for data center 102 such as managing hosts 105, managing VMs 120 running within each host 105, provisioning VMs, migrating VMs from one host to another host, and load balancing between hosts 105. Virtualization manager 130 may be a computer program that resides and executes in a central server in data center 102 or, alternatively, virtualization manager 130 may run as a virtual appliance (e.g., a VM) in one of hosts 105. One example of a virtualization manager is the vCenter Server™ product made available from VMware, Inc.

Gateway 136 provides VMs 120 and other components in data center 102 with connectivity to network 146. Gateway 136 may manage external public IP addresses for VMs 120, route traffic incoming to and outgoing from data center 102, and provide networking services, such as firewalls, network address translation (NAT), dynamic host configuration protocol (DHCP), and load balancing. Gateway 136 uses data network 118 to transmit data network packets to hosts 105. Gateway 136 may be a virtual computing instance, a physical device, or a software module running within host 105. Gateway 136 may include two gateways: a management gateway for management network 128 and a data gateway for data network 118.

Client device 104 further comprises storage 140 and is further coupled to remote devices 160. Storage 140 represents persistent storage devices (e.g., one or more hard disks, flash memory modules, solid state disks, and/or optical disks) at client device 104. In one example embodiment, files 150A, 150B, and 150C are stored in storage 140. Remote devices 160 comprise one or more resources associated with client device 104. In this example, remote devices 160 are remote to VMs 120 and local to client device 104. Remote device 160 can be a resource such as a printer or a smart card in one embodiment.

As discussed, VDI agent 124 and VDI client 134 are configured to implement a network redirector protocol so that host 105 (e.g., VM 120) can access resources, such as files in storage 140 and remote devices 160, at client device 104. For example, an application 126 running on VM 120 may need access to remote device 160, which is a printer that is local to client device 104 and therefore remote from VM 120. The VDI agent 124 sends the requests for the printer from application 126 to VDI client 134. For example, VDI agent 124 is registered with guest OS 122 such that it intercepts requests for resources from application 126. VDI client 134 processes and fulfills the requests. For example, VDI client 134 is configured to selectively forward a request to OS 132 based on access control implemented by VDI client 134 as will be discussed. OS 132 then accesses the resource based on the request and responds (e.g., with data, files, or other suitable response) to VDI client 134. In this example, OS 132 accesses the printer. The VDI client 134 then responds back to VDI agent 124. In another example, application 126 may request access to a file such as file 150A in storage 140 of client device 104. The VDI client 134 and VDI agent 124 provide application 126 with access to file 150A as discussed.

In embodiments herein, access control is implemented by VDI client 134 to provide customized security. In particular, VDI client 134 is configured with access filters to implement the access control. Access filters are software running in VDI client 134 configured to implement access rules. In particular, each access filter is configured to implement one or more access rules. An access rule indicates how a resource is allowed to be accessed (e.g., read only access, read/write access, no access, full access, etc.). An access rule may further indicate to what entity the access rule applies, such as a particular user, device, application, etc. That is, a first user may have a specific type of access that a second user does not have. Similarly, a first device or application may have a specific type of access that a second device or application does not have. Access can be granted or denied based on the identity of the user, device, application, etc.

In certain embodiments, VDI client 134 is configured to provide a user interface configured to allow a user to input desired access rules. VDI client 134 is configured to then generate access filters that implement the access rules.

In certain embodiments, access rules are automatically generated by VDI client 134 based on user actions. For example, if a user performs a drag and drop operation using client device 104 to drag files or folders stored in storage 140 from client device 104 to the virtual desktop displayed on client device 104 that is provided by VM 120, access rules are generated to provide VM 120 with access to the dragged files or folders. It should be noted that such access rules can be on a per-file basis. For example, if four files were dragged from a folder containing more than four files, one or more access rules would be generated indicating that only those four files are accessible to VM 120, instead of the entire folder. If the VM 120 already has access to the entire folder before the four files were dragged, access to the entire folder would remain, and no additional access rule would be generated. VDI client 134 is configured to then generate access filters that implement the access rules.

In certain aspects, the type of access granted (e.g., read only, full access, etc.) is based on the type of action performed by the user. For example, if a file is immediately copied to a file system on the virtual desktop, or opened in a remote application executing on the virtual desktop, the type of access granted may be read only.

The access filters at VDI client 134 then actually implement the access rules, such as to cause VDI client 134 to selectively process and fulfill requests from VDI agent 124 running on VM 120. For example, when a request for a file 150 or a device 160 is received at VDI client 134 from VDI agent 124, the request is passed through the access filters so that the access rules can be applied to the request. In one example, the request is for a file 150 that VDI agent 124 generates in response to receiving from VDI client 134 an indication that a user has performed a drag and drop operation using client device 104 to drag file 150 from client device 104 to the virtual desktop displayed on client device 104 that is provided by VM 120. If the request obeys the access rules to access the file 150 or device 160, access is granted, and VDI client 134 processes and fulfills the request as discussed. If the request does not obey the access rules, access is denied. For example, VDI client 134 does not process the request. In some embodiments, VDI client 134 sends a response to VDI agent 124 that the access was denied.

In addition, in certain embodiments, the access filters can partially fulfill a request where certain resources requested in the request obey the access rules, and certain resources requested in the request do not obey the access rules. For example, VDI client 134 may receive from VDI agent 124 a request to access a folder. The access filters may indicate only a subset of the files in the folder is allowed be accessed. Accordingly, VDI client 134 filters the request by processing and/or fulfilling only the portion of the request that obeys the access rules. The VDI client 134 accordingly sends a response to the VDI agent 124 only including the resources allowed to be accessed.

For example, in one embodiment, VDI client 134 sends the request to OS 132 for the entire folder and receives all files of the folder. However, VDI client 134 filters the files, and only responds to VDI agent 124 with the files allowed to be accessed. In another embodiment, VDI client 134 sends the request to OS 132 only for the files allowed to be accessed. Though described with respect to files, VDI client 134 may similarly partially fulfill requests for other resources, such as for only a subset of certificates stored in a smart card.

A network redirector protocol is used to implement remote features such as client drive redirection, smart card redirection, and serial port redirection that allow an agent to access resources on the client device. When the agent attempts to access a file or device on the client, the agent sends a "create drive request" to the client. The client returns a specific device ID to the agent. The agent then uses the device ID to perform further operations. In this case, access control is added during the processing of the "create drive request" message to check if the requested access by the agent of the remote device is allowed. In addition, the query response messages in the protocol are sent through the filters before being returned to the agent, so that unauthorized information is removed.

Figure 2:
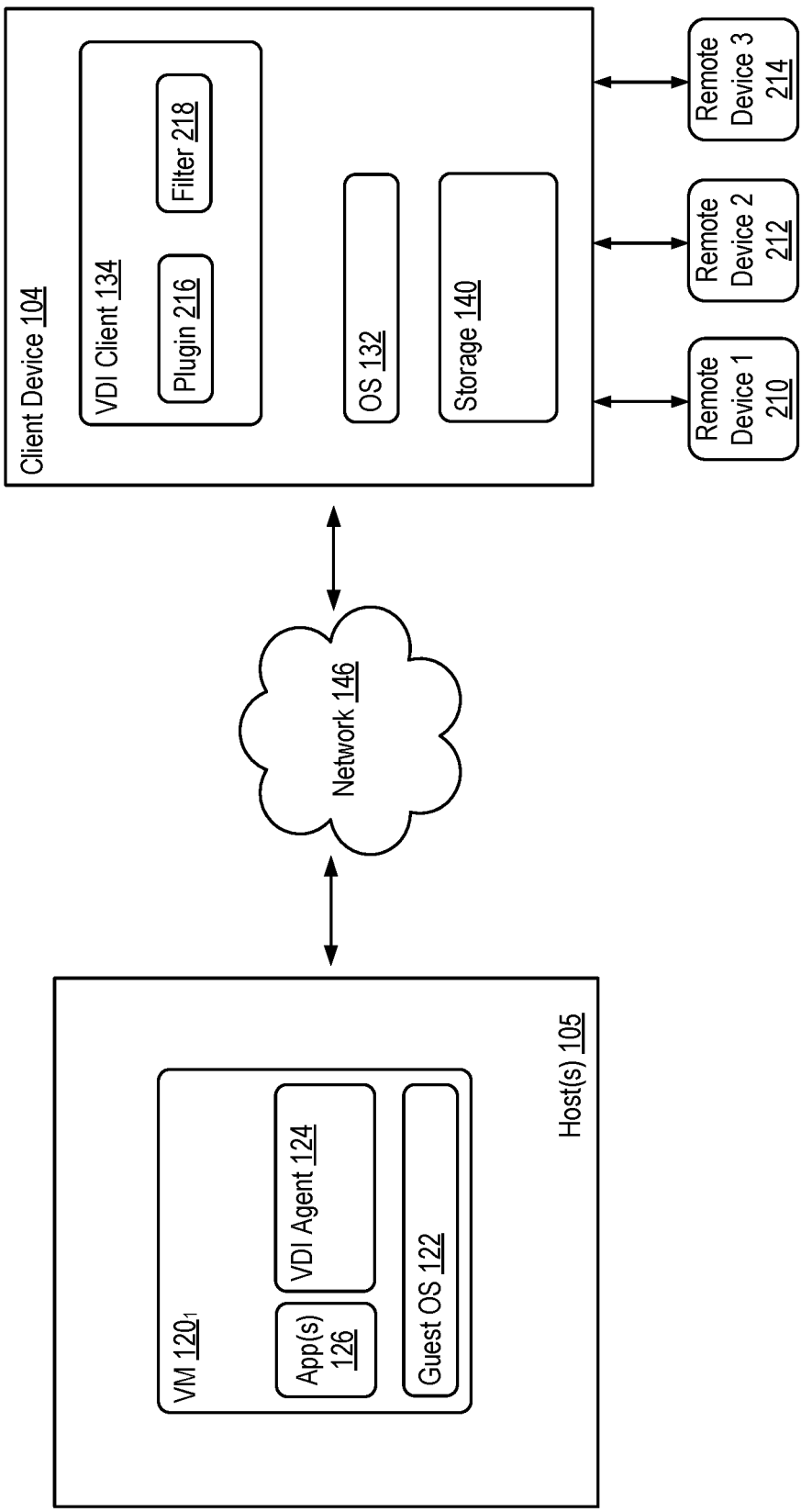
FIG. 2 depicts a block diagram for providing access control in a virtualized desktop infrastructure according to an embodiment.

FIG. 2 is a block diagram of a system for providing access control in a virtualized desktop infrastructure according to an embodiment. System 200 comprises a host 105 that includes a VM 120. VM 120 includes a VDI agent 124 and apps 126. Host 105 is connected to client device 104 through network 146. Client device 104 comprises VDI client 134 and storage 140. VDI client 134 includes plugin 216 and filter 218 in this embodiment. In addition, client device 104 is connected to remote devices 210, 212, and 214. Remote devices may comprise a resource such as a printer or a smart card in an embodiment.

In an embodiment, plugin 216 fulfills requests from host 105 (e.g., VDI agent 124) for access to a resource at client device 104. Requests can be fulfilled via a remote process in plugin 216. Access controls are enforced via the remote process using filter 218. Access controls use one or more filters 218 to reject certain requests, only show or transmit certain files, or take other actions based on user settings, system settings, or user actions.

As one example, host 105 requests access to a remote device on the client side, such as remote device 210. Remote device 210 may be a smart card in this example. A smart card stores one or more certificates. Host 105 requests specific certificate information that is stored in remote device 210. Multiple certificates may be stored on remote device 210, and for security reasons a user may only want the requested certificate to be shared with host 105. Therefore the response from client device 104 to host 105 is filtered through filter 218 so that only the requested certificate is shared with host 105. Alternatively, the request from host 105 may be filtered through filter 218 to ensure the request complies with the access controls. If the request does not comply with the access controls, filter 218 rejects the request. In some embodiments, filter 218 can partially fulfill a request instead of completely rejecting or completely allowing the request.

Figure 3:
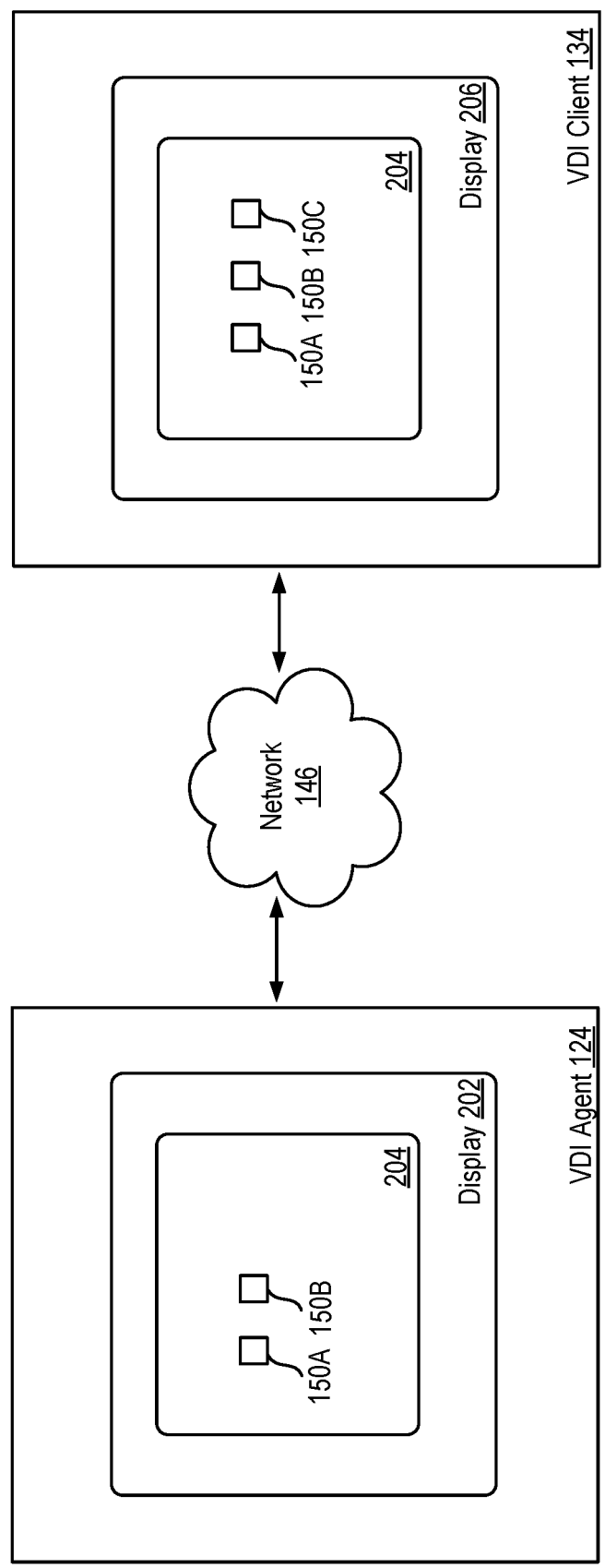
FIG. 3 depicts an example of providing access control in a virtualized desktop infrastructure according to an embodiment.

FIG. 3 illustrates a block diagram of a system 300 for providing access control in a virtualized desktop infrastructure according to an embodiment. System 300 comprises VDI agent 124. VDI agent 124 is coupled to VDI client 134 through network 146. Image frames of the desktop running on VM 120 that contains VDI agent 124 are shown as display 202. In this example, display 202 shows a window 204 of a file explorer and two icons that represent files 150A and 150B, which are files stored in a folder in storage 140 of client device 104.

System 300 further comprises VDI client 134. Image frames at VDI client 134 are shown as display 206. Files 150A, 150B, and 150C are stored in a folder at client device 104. The files are shown in a window 204. In this example, access controls prevent VDI agent 124 at host 105 from having access to every file in the folder. Instead, host 105 has access to files 150A and 150B, but not to 150C.

In one embodiment, a user sets the access controls and selects the files that host 105 has access to. In another embodiment, the access controls are tied to a user action. For example, the user may have performed a drag and drop operation and dragged files 150A and 150B to host 105. Therefore host 105 only has access to the dragged files, instead of every file in the folder. Additionally, host 105 would not see a listing of any of the other files in the folder other than the files with which host 105 has access.

Users can implement a variety of types of access controls. For example, a user can use access controls to limit the types of files that are shared. The user can limit sharing based on factors such as file type, modify date, create date, filename, or any other suitable factor. These access controls can be implemented using additional user interface elements, or can be implemented based on user actions.

Figure 4:
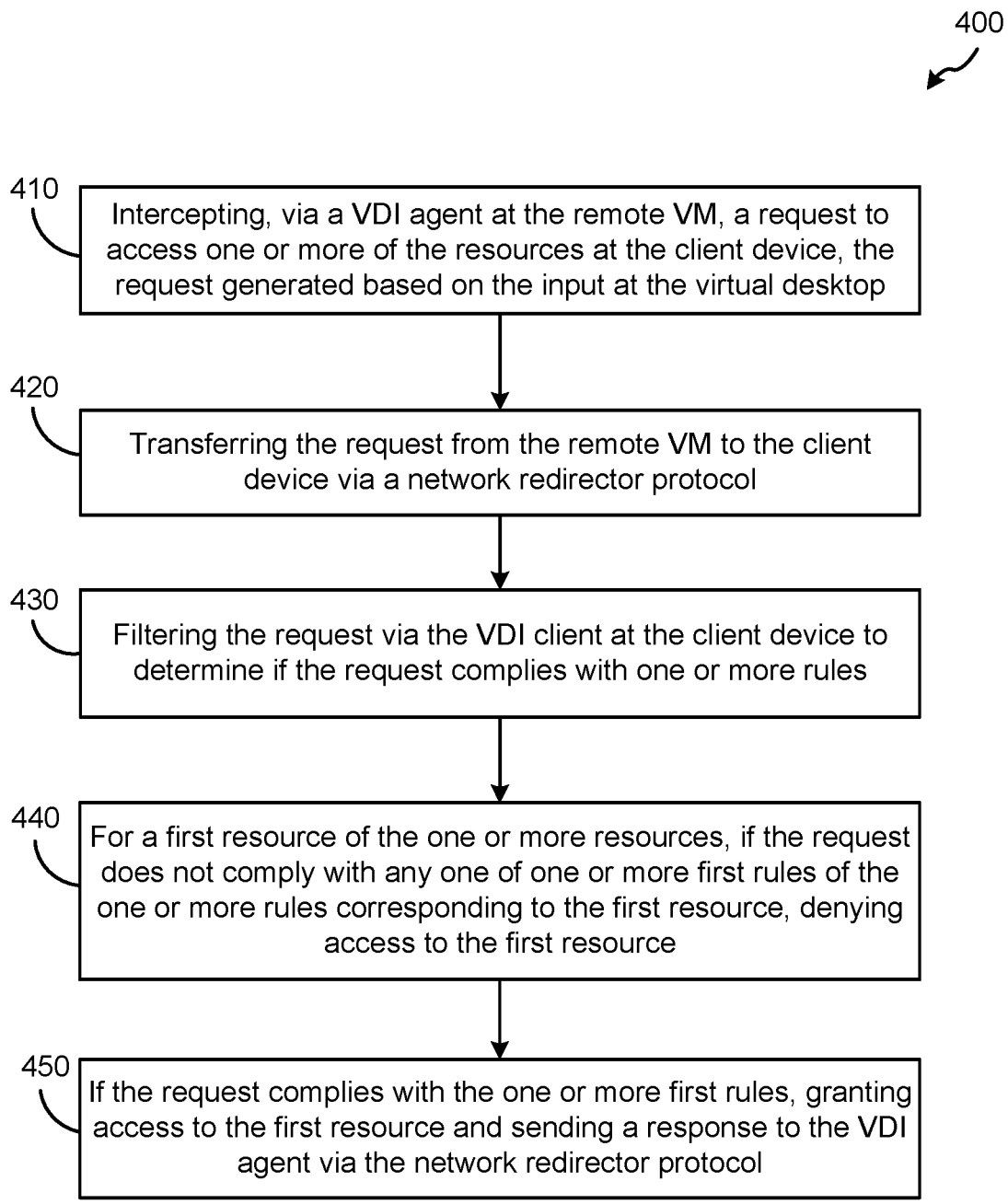
FIG. 4 is a flowchart illustrating a method for providing access control in a virtualized desktop infrastructure according to an embodiment.

FIG. 4 is a flowchart illustrating a method 400 for accessing one or more resources at VDI client 134 running on client device 104 by remote VM 120. Although the method steps are described in conjunction with FIGS. 1-3, any system configured to perform the method steps, in any suitable order, falls within the scope of the present invention.

The method 400 begins at step 410 where a request to access one or more of the resources (such as device 160 or files 150) at client device 104 is intercepted via VDI agent 124 at remote VM 120. The request is generated based on an input at the virtual desktop at remote VM 120. The request may be, for example, a request to access one of the files or folders at client device 104 (such as a request to access file 150A). In another embodiment, the request may be to access a specific one of the many certificates stored on a smart card. Also, the input may be a an action performed by a user with a keyboard or mouse. In one example, the user may attempt to drag and drop a file or folder stored in storage 140 from client device 104 to the virtual desktop displayed on client device 104 that is provided by VM 120, and the request is based on the user's attempt to perform the drag and drop action.

The method proceeds to step 420, where the request is transferred from remote VM 120 to client device 104 via a network redirector protocol. The network redirector protocol, as described above, allows remote VM 120 to access files or other resources at client device 104.

At step 430, the request is filtered via VDI client 134 at client device 104 to determine if the request complies with one or more rules. The rules can indicate to grant access to the resource or deny access to the resource. The rules can grant partial access to a resource in certain embodiments. The rules can indicate a type of access to grant to the resource based at least in part on a type of the action in certain embodiments. The type of access can be full access, read only, etc. In one example, if a file is immediately copied to a file system on the virtual desktop, or opened in a remote application executing on the virtual desktop, the type of access granted may be read only. The rules may also indicate a type of access to grant to the resource based at least in part on an identity of an application associated with the request. In other words, certain applications may be granted read only access to files while other applications may be granted full access to those same files. In addition, as described above, rules can be created by a user or administrator of the VDI environment and input via a user interface, or rules can be created automatically based on user actions. Rules can be implemented via a virtual channel plugin 126 at client device 104 in one embodiment.

The method then proceeds to step 440 where, for a first resource of the one or more resources, if the request does not comply with any one of one or more first rules of the one or more rules corresponding to the first resource, access to the first resource is denied. In one example, if a user attempts to drag and drop files 150A and 150B, the access rules may only allow the user to drag and drop file 150B. Therefore the request to drag and drop file 150A does not comply with the rules and the access to file 150A is denied, while access to file 150B is granted. As a result, access controls are implemented via rules at VDI client 134. In some embodiments, an error code or some other indicator can be transmitted to VM 120 to inform the user that access to one or more of the resources has been denied.

At step 450, if the request complies with the one or more first rules, access is granted to the first resource at client device 104 and a response is sent to VDI agent 124 via the network redirector protocol. VM 120 can then access the first resource. In the above example, if the rules allows the user to access both files 150A and 150B, then access to both resources is granted and the drag and drop action is completed.

The one or more resources at client device 104 could comprise any number or type of resources in other embodiments. Thus it is possible for a user or administrator to customize rules for different files, folders, devices, or other resources in any desired configuration. As also mentioned above, rules can grant certain applications or users access to only a specific subset of resources. The rules can grant or restrict access based on resource name, resource type, resource location, time, date, or any other suitable criteria.

It should be understood that, for any process described herein, there may be additional or fewer steps performed in similar or alternative orders, or in parallel, within the scope of the various embodiments, consistent with the teachings herein, unless otherwise stated. In embodiments described herein, a technical solution is provided for a technical problem. In one example embodiment, the technical problem is that the VDI client may grant the VDI agent access to more files or devices in the client device than is necessary to fulfill a request, which creates a security issue. An example technical solution presented herein is to provide access filters at the client device that implement access rules. The access rules operate to limit access to only files, devices, or other resources of the client device that are necessary to respond to the requests from the VM. The VM will therefore not have access to all resources at the client device, unless full access is necessary to fulfill the request.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of accessing one or more resources at a virtualized desktop infrastructure (VDI) client running on a client device by a remote virtual machine (VM), wherein the remote VM is connected to the VDI client through a network and the remote VM and VDI client provide a virtual desktop at the client device, the method comprising:
   receiving, by the VDI client of the client device from a VDI agent at the remote VM, a request to access at least one resource associated with the client device, the at least one resource comprising a first resource and a second resource, the request generated based on an input at the virtual desktop;
   determining at the VDI client of the client device whether to grant access to the at least one resource based on one or more rules defined for accessing resources associated with the client device, wherein the one or more rules comprise a first rule associated with the first resource and a second rule associated with the second resource, wherein the request complies with the first rule, but does not comply with the second rule; and
   granting, by the VDI client of the client device, access to the first resource, but not to the second resource, based on the first rule and the second rule, and sending, by the VDI client of the client device, a response to the VDI agent of the remote VM.

2. The method of claim 1, wherein at least one of the one or more rules is automatically generated based on an action performed at the client device.

3. The method of claim 2, wherein the action comprises a file stored at the client device being dragged and dropped to the virtual desktop, and wherein the at least one of the one or more rules indicates to grant access to the file.

4. The method of claim 2, wherein the at least one of the one or more rules indicates a type of access to grant for accessing at least one of the at least one resource based at least in part on a type of the action.

5. The method of claim 1, wherein the request comprises a request to access a folder comprising the first resource and the second resource, the first resource comprising a first file and the second resource comprising a second file, wherein the first rule indicates to grant access to the first file and the second rule indicates to deny access to the second file.

6. The method of claim 1, wherein the first resource comprises a certificate stored on a smart card.

7. The method of claim 1, wherein at least one of the one or more rules indicates a type of access to grant for accessing the first resource based at least in part on an identity of an application associated with the request.

8. The method of claim 1, wherein the response to the VDI agent is filtered to remove unauthorized information in the response.

9. The method of claim 1, wherein the one or more rules are implemented via a virtual plugin at the client device.

10. A non-transitory computer-readable medium comprising instructions to be executed in a processor of a computer system, the instructions when executed in the processor cause the computer system to carryout a method of accessing one or more resources at a virtualized desktop infrastructure (VDI) client running on a client device by a remote virtual machine (VM), wherein the remote VM is connected to the VDI client through a network and the remote VM and VDI client provide a virtual desktop at the client device, the method comprising:
   receiving, by the VDI client of the client device from a VDI agent at the remote VM, a request to access at least one resource associated with the client device, the at least one resource comprising a first resource and a second resource, the request generated based on an input at the virtual desktop;
   determining at the VDI client of the client device whether to grant access to the at least one resource based on one or more rules defined for accessing resources associated with the client device, wherein the one or more rules comprise a first rule associated with the first resource and a second rule associated with the second resource, wherein the request complies with the first rule, but does not comply with the second rule; and
   granting, by the VDI client of the client device, access to the first resource, but not to the second resource, based on the first rule and the second rule, and sending, by the VDI client of the client device, a response to the VDI agent of the remote VM.

11. The non-transitory computer-readable medium of claim 10, wherein at least one of the one or more rules is automatically generated based on an action performed at the client device.

12. The non-transitory computer-readable medium of claim 11, wherein the action comprises a file stored at the client device being dragged and dropped to the virtual desktop, and wherein the at least one of the one or more rules indicates to grant access to the file.

13. The non-transitory computer-readable medium of claim 11, wherein the at least one of the one or more rules indicates a type of access to grant for accessing at least one of the at least one resource based at least in part on a type of the action.

14. The non-transitory computer-readable medium of claim 10, wherein the request comprises a request to access a folder comprising the first resource and the second resource, the first resource comprising a first file and the second resource comprising a second file, wherein the first rule indicates to grant access to the first file and the second rule indicates to deny access to the second file.

15. The non-transitory computer-readable medium of claim 10, wherein the first resource comprises a certificate stored on a smart card.

16. The non-transitory computer-readable medium of claim 10, wherein at least one of the one or more rules indicates a type of access to grant for accessing the first resource based at least in part on an identity of an application associated with the request.

17. The non-transitory computer-readable medium of claim 10, wherein the response to the VDI agent is filtered to remove unauthorized information in the response.

18. The non-transitory computer-readable medium of claim 10, wherein the one or more rules are implemented via a virtual plugin at the client device.

* * * * *